United States Patent [19]

Janes

[11] Patent Number: 5,581,997
[45] Date of Patent: Dec. 10, 1996

[54] PERFORMANCE ENHANCED GAS TURBINE POWERPLANTS

[75] Inventor: Clarence W. Janes, Sacramento, Calif.

[73] Assignee: California Energy Commission, Sacramento, Calif.

[21] Appl. No.: 550,597

[22] Filed: Oct. 31, 1995

Related U.S. Application Data

[63] Continuation of Ser. No. 182,661, Jan. 12, 1994, Pat. No. 5,490,377, which is a continuation-in-part of Ser. No. 139,525, Oct. 19, 1993, abandoned.

[51] Int. Cl.$^6$ .............................. F02C 3/28; F02C 7/141
[52] U.S. Cl. .................. 60/39.12; 60/39.58; 60/728; 60/736
[58] Field of Search ...................... 60/39.02, 39.12, 60/39.465, 39.511, 39.59, 728, 736, 39.05, 39.58

[56] References Cited

U.S. PATENT DOCUMENTS

| 2,625,012 | 1/1953 | Larrecq . |
| 2,633,707 | 4/1953 | Hermitte et al. . |
| 3,166,902 | 1/1965 | Maljanian et al. . |
| 3,785,145 | 1/1974 | Amann . |
| 3,949,548 | 4/1976 | Lockwood, Jr. . |
| 3,969,892 | 7/1976 | Stettler et al. . |
| 4,182,127 | 1/1980 | Johnson . |
| 4,765,142 | 8/1988 | Hakhamkin . |
| 4,858,428 | 8/1989 | Paul . |
| 4,872,307 | 10/1989 | Nakhamkin . |
| 4,885,912 | 12/1989 | Nakhamkin . |
| 5,095,693 | 3/1992 | Day . |
| 5,133,180 | 7/1992 | Horner et al. . |
| 5,161,365 | 11/1992 | Wright . |
| 5,313,790 | 5/1994 | Barr . |
| 5,347,806 | 9/1994 | Nakhamkin . |
| 5,392,595 | 2/1995 | Glickstein et al. ............ 60/736 |

FOREIGN PATENT DOCUMENTS

| 0150990 | 8/1985 | European Pat. Off. . |
| 15917 | 2/1977 | Japan . |
| 60-93132 | 5/1985 | Japan . |
| 851940 | 10/1960 | United Kingdom . |
| 2227796 | 8/1990 | United Kingdom . |
| 2232721 | 12/1990 | United Kingdom . |
| 2264539 | 9/1993 | United Kingdom . |

OTHER PUBLICATIONS

CEC; "Chemically Recuperated Gas Turbine . . . and Reheat (1992) Gas Turbine World," p. 37.
The HAT Cycle; Electric Power Research Institute; undated.
Janes, C. W.; "Increasing Gas Turbine Efficiency . . . " (1979) Amer. Chem. Society, 799423, pp. 1968–1972.
Makansi, J.; "Developments to Watch . . . " (1990) Power Magazine vol. 34, No. 6.

Primary Examiner—Louis J. Casaregola
Attorney, Agent, or Firm—John P. O'Banion

[57] ABSTRACT

A gas turbine driven powerplant having one or more compressors for producing a down stream air flow, a heat exchanger positioned down stream of the compressors followed by a side stream flow coolant line, a regenerator positioned down stream of the heat exchanger and side stream coolant line, a combustor positioned down stream of the regenerator, one or more turbines positioned down stream of the combustor and mechanically coupled to the compressors, and a power turbine positioned down stream of the turbines. Combustible effluent flows through the heat exchanger and to the combustor, and air discharged from the compressors flows through the heat exchanger and to the coolant line and regenerator. Heat is transferred from the compressor discharge air to the combustible effluent, thereby producing cooling air and heating the combustible effluent. The heat exchanger can be a heat exchanger or a methane/steam reformer which produces a hydrogen-rich, low $NO_x$, steam diluted combustible effluent. In further embodiments, a small portion of the cool air is combined with the recuperation water in a heat recovery unit to allow vaporization of the water throughout the initial portion of the heat exchange path and form a two phased feed of water and air to the combustor. Additionally, in all embodiments a portion of the cooled compressed air can be processed by a compressor/expander for providing coolant to the turbines, compressors, and auxiliary equipment.

6 Claims, 10 Drawing Sheets

PERFORMANCE ENHANCED GAS TURBINE POWERPLANTS

CROSS-REFERENCE TO RELATED APPLICATIONS

This application is a continuation of application Ser. No. 08/182,661 filed on Jan. 12, 1994 (U.S. Pat. No. 5,490,377), which is a file wrapper continuation-in-part of application Ser. No. 08/139,525 filed on Oct. 19, 1993 (abandoned).

BACKGROUND OF THE INVENTION

1. Field of the Invention

This invention pertains generally to gas turbine engine driven powerplants, and more particularly to a gas turbine driven powerplant in which a heat exchanger is used to simultaneously cool high temperature compressor discharge air and heat and/or reform a fuel and water mixture for the combustor. The cooled compressed air exiting the heat exchanger provides ultra-cool air for cooling metal components, for recuperating normally rejected low grade heat from other powerplant ancillary operations, and for feeding through a plate-fin regenerator to recover and return power turbine exhaust heat to the combustor. The hot fuel mixture exiting the heat exchanger may be sent directly to the combustor or first chemically reformed to produce a low pollutant producing fuel gas. Alternatively, instead of feeding the bulk of the cooled compressed air through a plate-fin recuperator, the cool air from the exchanger can be routed directly to the combustor. Instead of recuperating the exhaust heat with cool air, an additional fuel/water mix will recuperate the exhaust heat. The resulting superheated fuel gas increases mass flow through the turbine proportionally increasing power output.

2. Description of the Background Art

Gas turbine engines are in wide use, and are ever more often the prime mover of choice. For example, the jet engine is an example of a successful gas turbine application since gas turbine engines have no equal for powering large aircraft. While the modern jet engine is the product of over 50 years of engineering development, the jet engine must fly and, therefore, the design options to enhance performance are necessarily limited. On the other hand, ground applications of advanced aircraft gas turbine engines allow use of additional performance enhancing techniques. In the air or on the ground, however, the principal long term route to increased powerplant performance has been through higher engine compression ratios and higher firing temperatures.

Higher firing temperatures have evolved through a succession of innovative cooling strategies involving compressor bleed air used as turbine coolant to maintain acceptable limits on sustainable temperatures seen by the turbine's metal alloys. Bleed air flow, however, reduces gas turbine power and performance. The ever higher compression ratios also necessarily mean higher compressor discharge air temperatures, thereby limiting bleed air cooling effectiveness and requiring additional bleed air flows of the high temperature, high pressure air to effect the same metal cooling. The present invention, as will be shown, will enable metal component cooling with compressor discharge air at or near ambient temperatures. The new coolant, it will be shown, will allow for a significant reduction in bleed air required and/or a significant increase in firing temperature and/or both. The new coolant will also allow creation of a low temperature heat sink. Low grade heat is normally too cool to be recovered and recycled and, therefore, generally requires continuous removal and rejection to the surroundings by means of a cooling tower or the like. Such heat is generated during operation of ancillary powerplant equipment from sources such as friction in the bearings of the generator and of the gas turbine, and appears in the hot lubricating oil. Low grade heat is also produced by the generator windings in the form of "copper losses," amounting to as much as 0.5 to 1.5 percent of the electrical energy generated, and is generally continuously removed by means of a water cooling loop. Also, the electrical transformer experiences "iron losses" due to the hysteresis effect in the iron core of the transformer. This significant heat load is carried away in the circulating transformer oil, and the heat in the hot oil is rejected to the atmosphere by means of air blast heat exchangers. Economic recovery of this low grade heat for return to the cycle is not possible without a low temperature heat sink which is allowed by this invention.

In ground applications, the recovery, recycle, and conversion of heat remaining in the gas turbine exhaust has been another route to higher overall powerplant performance. The high temperature turbine exhaust heat is normally recovered by conventional steam raising techniques, or, in older low pressure gas turbine powerplants, by a regenerator (plate-fin air-to-gas heat exchanger) employing a counter current discharge air against the flow of higher temperature turbine exhaust gas. The ever increasing compressor discharge air temperature of the newer gas turbines, however, limits the heat recovery effectiveness of regenerators. In gas turbines derived from advanced aircraft engines, the compressor discharge temperatures are 200 to 300 degrees Fahrenheit greater than turbine exhaust temperature, thereby ruling out use of a regenerator altogether. In the high pressure turbine engine driven powerplant, steam is raised in a conventional boiler to extract exhaust heat, routed to a condensing steam turbine with condensate recycled to the boiler. This combination of a gas turbine and steam turbine bottoming cycle is referred to as a combined cycle powerplant. The present invention, as will be shown, capitalizes on the higher compressor discharge air temperatures in the advanced aircraft-engine-derived gas turbines and, in doing so, eliminates the relatively unproductive steam cycle from the powerplant.

Alternatively, heat recuperating steam raised in the boiler from the turbine exhaust heat is simply injected into the gas turbine flow path before the combustor for power augmentation. The gas turbine engine's increasingly higher firing temperatures and compression ratios thermodynamically favor the steam injection option over the steam bottoming cycle. Additionally, direct steam injection into the gas turbine combustor obviates the need for purchase and operation of a condensing steam turbine, condenser, cooling tower, and interconnecting circulating water piping. Elimination of the steam bottoming cycle and its associated equipment increases overall plant durability, reliability, availability, and maintainability. In the present invention, as will be shown, the recuperated heat is returned to the gas turbine combustor as high energy steam with all of the previously stated performance advantages of steam injection over steam cycle accruing.

As firing temperatures are increased in advanced gas turbine engines, they produce nitrogen oxides, $NO_x$, at exponentially increasing rates. Controlling emissions at the combustor to ever more stringent air quality emission limitations is a major combustor development problem. Peak temperatures in the combustor occur at the flame front where fuel and air react. Dilution of the fuel prior to combustion limits the flame temperatures. Fuel dilution can be effected with air, steam, or any noncombustible gas. Steam or water injection, in addition to achieving the aforementioned power augmentation, has long been used to reduce $NO_x$ formation in the combustor. Dilution can be accomplished in the combustor, but is more effective if accomplished in the fuel stream alone prior to injection into the combustor due to improved mixing. Fuel dilution with air as the diluent is currently being accomplished in specially designed premix "dry low $NO_x$" or "dry low emission" combustors. However, with natural gas, or with liquid fuels, combustibility problems limit the amount of fuel dilution that can be accomplished before combustor flame out occurs. Several of the gas turbine manufacturers warranties are invalid if operated at fuel dilution levels of greater than two pounds of steam per pound of fuel. The $NO_x$ concentration at this flame out dilution is still many times greater than is legal to operate in California and other jurisdictions. Carbon monoxide, formaldehyde, and other unburned products also increase greatly with steam usage as combustion becomes more incomplete. $NO_x$ can be further reduced in the exhaust gas flow by injecting ammonia, together with placement of a suitable catalyst. Carbon monoxide in the exhaust gas can also be catalytically oxidized with a suitable catalyst. Emission control by means of selective catalytic reduction (SCR) with ammonia is a significant cost and liability risk as ammonia is expensive, a hazardous toxic material, and handling presents an on-going safety problem. With all of the acknowledged drawbacks SCR is (without a better option) deemed the "Best Available Control Technology" (BACT) and is legally mandated in some jurisdictions. The present invention, as will be shown, will achieve the required emission levels of all potential pollutants without the use of SCR or oxidation catalyst.

Two additional, long-recognized, design techniques for enhancing gas turbine engine performance are intercooled compression and a reheat combustor firing before the power turbine. Intercooling, while enhancing performance, also results in increased design complexity and expense for development work. Reheat, while increasing power output, also raises temperatures throughout the power turbine, requiring a major bleed of cooling air significantly reducing the net efficiency gains. Conventional reheat development costs may exceed those for intercooling. The present invention, as will be shown, does not entail the development cost associated with either intercooling or conventional reheat. Furthermore, the present invention introduces a novel method of achieving reheat with little modification required of the existing gas turbine engine.

Therefore, there is a need for a high efficiency gas turbine driven powerplant which produces low $NO_x$ emissions at higher firing temperatures. The present invention satisfies that and other needs as described herein, and overcomes the deficiencies in conventional designs.

SUMMARY OF THE INVENTION

In a conventional gas turbine driven powerplant, the high temperature compressor discharge air mainly flows directly into the combustor, but a significant portion of the high pressure air is bled off and is necessarily routed away and used to cool metal components. Compressor discharge air, although at a high temperature, is the only air available at a sufficient pressure to effect the necessary cooling of the high pressure turbine hot sections. Recovery of heat in the turbine exhaust flow is an independent operation. The required flow of fuel to the combustor is another independent operation. The emission reductions are still another independent operation. Augmentation of the gas turbine power in the optimum manner is even another independent operation. The present invention, as will be shown, integrates these independent gas turbine powerplant functions in a performance enhancing manner.

By way of example, and not of limitation, the present invention positions a heat exchanger down stream of the high pressure compressor. This device simultaneously transfers the thermal energy in the compressed high temperature air to a counter current flow of a cold combustible/water (fuel) mixture to produce a highly desirable low emission high temperature, diluted fuel (potentially hydrogen rich) going to the combustor and cools the high temperature compressed air by approximately 1000 degrees Fahrenheit. The heat exchanger thus provides a far more effective cooling medium for the turbine metal components than the standard uncooled high pressure air. This cooling medium also permits low grade heat from other powerplant operations such as the heat generated in bearings, transformer, and generator windings to be routed back to the combustor where it supplements the highest grade heat in the system. This may reduce or eliminate the cost of cooling equipment for those operations. The remaining cooled compressed air not required for cooling (a larger fraction than in the conventional gas turbine) is reheated in a regenerator (plate-fin recuperator) that simultaneously extracts heat from the high temperature turbine exhaust and reheats the counter current flow of compressed air prior to entry into the combustor. Alternatively, instead of feeding the bulk of the cooled compressed air through a plate-fin recuperator, the cool air from the exchanger can be routed directly to the combustor. Instead of recuperating the exhaust heat with cool air, an additional flow of fuel/water mix will recuperate the exhaust heat. The resulting superheated fuel gas increases mass flow through the turbine proportionally increasing power output.

Another alternative for recuperating the exhaust heat would be to use a two phase air/water feed in which, while the bulk of the cool air is injected directly into the combustor, a small portion of the cool air can be combined with the recuperation water to form a two phased feed of water and air to the exhaust heat recovery steam generator. The superheated air/steam effluent from this heat recovery steam generator would be routed directly to the combustor. The advantage of a two phased feed (using either air or methane with water) is to allow vaporization of the water to occur throughout the initial portion of the heat exchange path. The air or methane gas phase provides volume for the flashed water vapor. This greatly enhances the heat carrying capacity of the fluid, and mitigates a common thermodynamic problem at the cold end of the heat exchanger. With water only as the heated fluid, the water temperature linearly approaches the temperature of the heating fluid until a minimum practical difference ("pinch point") is reached. This, in turn, establishes the size of the required heat transfer surface. By facilitating vaporization, the two phase feed generates a nonlinear temperature approach to the heating fluid, allowing a significant reduction in the heating surface and reducing thermodynamic irreversibilities.

The invention is presented herein in seven embodiments. The first four embodiments, each of increasing performance and each of increasing cost and degree of complexity, focus on using the bulk of the cooled compressed air from the compressor aftercooling heat exchanger to recuperate heat from the exhaust gas stream. The final three embodiments focus on using that same cooled compressed air in a different manner in order to augment power production at little or no increased cost. In these final embodiments, the cooled compressed air is injected directly into the combustor, enabling a larger amount of fuel/steam mixture to be burned and thereby increasing the mass flowing through the turbine thus augmenting power output. In these final embodiments, exhaust heat is recuperated in a heat exchanger that simultaneously cools the exhaust gas stream and heats the additional fuel/steam mixture or air/steam mixture for injection into the combustor. Each embodiment has common elements as summarized:

In all embodiments the heat exchanger lowers the compressor discharge temperature by approximately 1000 degrees Fahrenheit. The final temperature of the compressed air is set in all embodiments by the exchanger inlet temperature of the combustible/water mixture fuel feed, which is assumed to be at ambient temperatures (approximately 59 degrees Fahrenheit). The exchanger exit temperature of the cooled compressed air will be designed to approach the temperature of the fuel feed. An assumed design approach is approximately 86 degrees Fahrenheit, leaving the compressed air at approximately 145 degrees Fahrenheit. This then, in all embodiments, is the temperature of the cooled compressed air, a portion of which is routed for metal component cooling duty and low grade heat recovery duty, the remainder going either to the regenerator (plate-fin recuperator) in the first four embodiments of this invention or directly to the combustor in the final three embodiments. However, in all embodiments the cooling duties are accomplished in the following manner: The cooled compressed air exiting the heat exchanger is already at a sufficient pressure to allow injection for cooling of the high pressure turbine blades and vanes and is in excess of the cooling air pressure required to effect cooling of the blades and vanes of the low pressure turbine and the power turbine. However, the passage of the air through the heat exchanger leaves the pressure of the cool air insufficient to effect cooling of the blades of the final high pressure compressor stage. To exercise this unique opportunity to cool the high pressure compressor, one of two methods will be employed. In the first method, after a portion of the side stream of cooled compressed air exiting the heat exchanger has been routed to cool the high pressure turbine, the remainder of the side stream will be divided between the compressor and expander portions of a single-shaft booster compressor/expander. The expander will be fed by a flow sufficient to meet the low pressure turbine cooling air requirement. The shaft work derived by this small expansion will effect a slight cooling of this air and will supply the shaft work required by the booster compressor. The remaining air is routed to the booster compressor. A portion of the air exiting the booster compressor can be made available to effect high pressure compressor cooling. The remaining air exiting the booster compressor is available to accept the low grade heat that is generated in the gas turbine generator's ancillary equipment (e.g. bearings, transformers, and generator windings). This pressure boosted air will be employed as a tube-side coolant in a surface condenser. The condenser will be condensing refrigerant vapor generated through vaporization at the previously mentioned low grade heat sources. (An alternative heat sink design could use any suitable heat exchange medium.) The booster compressed air that has accepted this low grade heat is then routed back to the combustor where it supplements the highest grade heat in the system. This sink for low grade heat not only returns the heat to the cycle, but also reduces or eliminates capital and operating cost of rejecting this low grade heat. It also offers the possibility of economically refrigerating the generator to reduce resistance losses. In the second method, the entire side stream of cooled compressed air would be delivered to the single-shaft booster compressor/expander as described above and the high pressure turbine will be cooled by a portion of the pressure boosted air.

In a first embodiment, the present invention comprises a gas turbine engine having one or more compressor(s) for producing a down stream air flow, a heat exchanger positioned down stream of the compressor(s), followed by a side stream flow of cooled compressed hot-section-coolant air, a regenerator (plate-fin recuperator) down stream of the side stream, a combustor down stream of the regenerator, one or more turbine(s) down stream of the combustor, and a power turbine down stream and adjacent to the turbine(s). The power turbine exhaust gas stream flows back through the regenerator, is cooled, and courses out a stack. The heat exchanger simultaneously vaporizes and superheats a mixture of combustible component and water. The heated combustible effluent, diluted low-$NO_x$ fuel gas, from the heat exchanger fuels the gas turbine low-$NO_x$ combustor. The power turbine shaft transmits the work potential generated to the load. The heat exchanger positioned after the high pressure compressor may be a conventional hot-air-to-fuel heat exchanger or, for more effective heat exchange and the simultaneous production of a superior, hydrogen-rich fuel, may be a methane/steam reformer. Use of a catalytic methane/steam reformer takes advantage of the highly endothermic reaction that takes place in such reformers, and the resulting production of hydrogen for the fuel fed to the combustor allows higher firing temperatures with reduced formation of $NO_x$.

If a methane/steam reformer is not employed in the heat exchanger, an alternative exists to obtain a hydrogen-rich low-$NO_x$ fuel. The high temperature steam/fuel mixture exiting the heat exchanger can be passed through a bed of steam reforming catalyst. In this case, and in all embodiments described below in which the heat exchanger acts as a reformer-feed preheater, the following configuration is preferred.

The steam/fuel mixture exiting the heat exchanger must be of sufficient pressure to enter the combustor. Both the water and combustible entering the heat exchanger will have been raised to sufficient pressure (approximately 50 to 100 psia greater than the pressure in the combustor). The heat exchanger ideally has two requirements to meet: (1) it must reduce the compressed air temperature to the lowest practical level, and (2) it must produce as much steam/fuel mixture at the required pressure as possible. Lowering the air temperature in the heat exchanger to the lowest practical level requires generating steam at multiple pressures. However, in this instance, we have use for only one pressure of steam/fuel mixture—that pressure which will allow entry to the combustor and we wish to convert all of the heat extracted from the air side to steam at the required pressure. To allow the extraction of steam/fuel at multiple pressures while still meeting the need for injecting steam/fuel into the combustor at a the required pressure, a novel arrangement will be employed: if, by way of example, but not of limitation, the steam/fuel mixture is removed at four points in the heat exchanger, there will be four pressure levels, two in excess of required pressure and two below the required pressure. The two highest pressure steam/fuel flows will be routed through a steam turbine connected by a shaft to a steam compressor into which the two lower pressure steam/fuel flows will be routed. The higher pressure steam/fuel will drive the turbine and compressor so that the steam/fuel exhausting from the compressor and the turbine will be one combined flow at the required pressure. This example uses a single shaft at one speed. An option that would increase efficiency would use two concentric shafts at two different speeds. The same single pressure product steam can also be achieved, albeit less efficiently, by the use of a steam jet compressor (ejector). The compression is achieved in this instance without any moving parts but requires a higher ratio of high pressure to low pressure steam.

In an alternative embodiment, the invention comprises a gas turbine engine having one or more compressor(s) for producing a down stream air flow, a first methane/steam reformer positioned down stream of the compressor(s), followed by a side stream flow of cooled compressed hot-section-coolant air, a regenerator (plate-fin recuperator) down stream of the side stream, a combustor down stream of the regenerator, one or more turbine(s) down stream of the combustor, a power turbine down stream and adjacent to the turbine(s), and a second methane/steam reformer positioned in the exhaust gas stream and adjacent to the regenerator.

In this second embodiment, the power turbine exhaust gas flow is allocated between the regenerator and the coils of the second methane/steam reformer, respectively. Through mechanical design of the regenerator (given expected pressures and volumes of exhaust stream gas and cooled compressed air from the first methane/steam reformer), enough of the power turbine exhaust gas stream heat will be directed through the regenerator to simultaneously bring the temperature of the cooled compressed air flow up to a close approach to the temperature of the exhaust gas stream while bringing the temperature of the exhaust gas stream down to a close approach to the temperature of the cooled compressed air. The remaining heat contained in the power turbine exhaust gas stream is available for use in the second methane/steam reformer which is designed to extract enough of that heat to cool this second portion of the exhaust gas stream to approximately the same temperature as the portion of the exhaust gas stream exiting the regenerator. This division of exhaust gas flow into two parallel flows will yield a thermodynamically matched heat exchange regenerator.

The combustible effluent from the coils of the second methane/steam reformer combines with the combustible effluent from the coils of the first methane/steam reformer to provide low $NO_x$ fuel to the gas turbine low $NO_x$-combustor. Both reformers are fed by a mixture of methane (pipeline natural gas) and water. Further down stream, the two cooled, parallel-flowing, power turbine exhaust gas streams exiting the regenerator/reformer section rejoin and course out one or more stack(s). The power turbine shaft transmits the work potential generated to the load.

In still another embodiment, the invention comprises a gas turbine engine having one or more compressor(s) for producing a down stream air flow, a reformer feed preheat exchanger positioned down stream of the compressor(s), followed by a side stream flow of cooled compressed hot-section-coolant air, a regenerator (plate-fin recuperator) down stream of the side stream, a combustor down stream of the regenerator, one or more turbine(s) down stream of the combustor, a power turbine down stream and adjacent to the turbine(s), a methane/steam reformer positioned in the exhaust gas stream, and a second reformer feed preheat exchanger positioned in the exhaust gas stream downstream of the methane/steam reformer and adjacent to the regenerator.

In this third embodiment, the entire power turbine exhaust gas stream flows over the coils of the methane/steam reformer, and the methane/steam reformer is fed with the effluent from both reformer feed preheat exchangers. This embodiment anticipates a significant increase in firing temperature with resultant increase in turbine exhaust temperature over previous embodiments.

Both reformer feed preheat exchangers are fed by a mixture of cold methane and water. The combustible effluent, a low-$NO_x$ fuel, from the methane/steam reformer coils fuels the gas turbine low $NO_x$-combustor. Down stream of the reformer section, the partially cooled power turbine exhaust gas flow is allocated between the regenerator and the second reformer feed preheat exchanger, respectively, in accordance with design principles described in the discussion of the second embodiment. This division of exhaust gas flow will yield the thermodynamically matched heat exchange regenerator as described above. Further down stream, the two cooled, parallel-flowing, power turbine exhaust gas streams exiting the regenerator/preheater section rejoin and course out one or more stack(s). The power turbine shaft transmits the work potential generated to the load.

In still another embodiment, the invention comprises a gas turbine engine having one or more compressor(s) for producing a down stream air flow, a high pressure reformer feed preheat exchanger down stream of the compressor(s), followed by a side stream flow of cooled compressed metal component coolant air, a regenerator (plate-fin recuperator) down stream of the side stream, a combustor down stream of the regenerator, one or more turbine(s) down stream of the combustor, a free power turbine down stream but, not adjacent to the turbine(s), a reheat combustor between the turbine(s) and the free power turbine, a high pressure methane steam reformer positioned in the exhaust gas stream, a low pressure methane/steam reformer positioned in the exhaust gas stream adjacent to the high pressure methane/steam reformer, and a low pressure reformer feed preheat exchanger positioned in the exhaust gas stream downstream of the reformers and adjacent to the regenerator.

In this fourth embodiment, we use a low pressure reheat combustor fueled by the effluent from the low pressure methane/steam reformer. This reheat will assure elevation of the turbine exhaust temperature significantly higher than the compressor discharge temperature. In addition, the exhaust gas flow exiting the power turbine is allocated between the coils heating the high pressure methane/steam reformer and the coils heating the low pressure methane/steam reformer. This division of exhaust gas flow will be achieved through design principles discussed above and will yield the thermodynamically matched heat exchange regenerator.

The high pressure reformer is fed from the high pressure preheat exchanger, which in turn is fed by a cold mixture of methane and water. The low pressure reformer is fed by the low pressure preheat exchanger, which in turn is fed by a cold mixture of methane and water. A combustible effluent, a low-$NO_x$ fuel, from the high pressure reformer coil fuels the gas turbine low-$NO_x$ combustor. A combustible effluent from the low pressure reformer coil fuels a reheat low-$NO_x$ combustor. The reheat combustion takes place in the main gas flow path after the turbine and prior to entry to the power turbine (see following paragraph). Down stream of the two reformers the partially cooled parallel-flowing power turbine exhaust gas streams, still divided after exiting the two high and low pressure reformers, flow in parallel through both the low pressure reformer feed preheat exchanger (see above) and through the regenerator, respectively. Still further down stream, the two cooled, parallel-flowing, power turbine exhaust gas streams exiting the dual regenerator/ preheater section, rejoin and course out one or more stack(s).

The power turbine shaft transmits the work potential generated to the load.

This embodiment of the invention employs a unique procedure to effect reheat combustion in order to raise the generation per pound of exhaust flow. The high temperature hydrogen-rich low pressure fuel gas effluent from the low pressure reformer is introduced into the gas turbine flow path from the trailing edge of the stationary vanes and/or rotating blades of the low pressure turbine up stream of the power turbine. Because of the unique combustion characteristics of the hydrogen component and high temperature of the low-$NO_x$ fuel and the high air temperature, the fuel will auto ignite (i.e. require no flame holder apparatus) with complete combustion occurring in a nominal distance after injection into the air stream. Thus, the reheat combustion can be readily accomplished using available stationary vanes and/or rotating blades with their existing internal air cooling passages to also effect metal cooling, but, particularly, to convey the low $NO_x$ fuel to the trailing edge injection orifices for injection into the main gas stream with rapid and complete combustion assured and with maximum fuel dilution/mixing and therefore, minimum $NO_x$ generating potential.

As noted above, the final three embodiments of the invention emphasize augmentation of power output by increasing the mass flow through the turbine. This is achieved by injecting the cooled compressed air not required for metal component cooling and low grade heat recuperation directly into the combustor. This requires more fuel to be burned in order to achieve the firing temperatures at which the turbine is designed to operate. This higher fuel demand also permits increased injection of steam, and this additional fuel and water can be used to recuperate the exhaust heat. Thus these embodiments will not use a regenerator (plate-fin recuperator), but rather will recuperate the exhaust heat with a counter-current flow of combustible and water, or water and air, in a conventional once-through heat recovery unit.

In the fifth embodiment, the cool compressed air exiting the heat exchanger will perform the previously enumerated cooling functions (e.g. cooling of metal components in the engine hot sections, acting as a heat sink for returning to the cycle the low grade heat generated in the bearings, transformer, and generator windings). The remaining cool air goes directly to the combustor. The effluent from the heat exchanger and the exhaust heat recovery unit will be combined and fed through a conventional adiabatic catalytic methane-steam reformer which will generate a significant hydrogen component to enhance combustion at high dilution thus allowing reduced formation of $NO_x$. This low Btu fuel gas exits the reformer and is injected into and fuels the combustor.

In the sixth embodiment, cooling duties and the cool air flow to the combustor are identical to the fifth embodiment. In this embodiment, the hot fuel gas effluent from the heat exchanger is passed through a conventional adiabatic catalytic methane-steam reformer. This will produce a significant hydrogen component in the fuel gas effluent and a temperature drop of approximately two to three hundred degrees Fahrenheit. This cooler fuel gas flow combines with the counter-current flow of fuel gas in the exhaust heat recovery unit at the point where the fuel gas in that unit has achieved approximately the same temperature. The combined flow recuperates the remaining high temperature fraction of the exhaust gas heat. The purpose of this embodiment is to minimize the amount of exhaust heat recuperation water required.

If the hydrogen content of this combined flow of fuel gas is sufficient to support high dilution combustion, the flow of fuel gas is routed directly to the combustor. However, if additional hydrogen is required, it can be produced by passage of the fuel gas stream through an auto-thermal reformer prior to injection of the fuel gas into the combustor. The auto-thermal reformer, if required, will use a small addition of the cooled high pressure air in order to maintain the fuel gas temperature while passing through the reforming catalyst bed.

In the final embodiment, cooling duties and the cool air flow to the combustor are identical to the fifth and sixth embodiments except that a small portion of the cool air can be combined with the recuperation water to form a two phased feed of water and air to the exhaust heat recovery steam generator. The advantage of a two phased feed (using either air or methane with water) is to allow vaporization of the water to occur throughout the initial portion of the heat exchange path. By facilitating vaporization, the two phase feed generates a nonlinear temperature approach to the heating fluid, allowing a significant reduction in the heating surface and reducing thermodynamic irreversibilities.

An object of the invention is to utilize the most efficient aircraft engine available in serial production, with the minimum of modifications and development time and cost, as the prime mover in a ground based power plant (i.e. no intercooling, no conventional reheat required).

Another object of the invention is to provide an effective source of high pressure cooling air approximately 1000 degrees Fahrenheit lower in temperature than the cooling air normally available to the gas turbine designers (i.e. provide means to obtain significantly higher firing temperatures and/or reduce bleed air requirements).

Another object of the invention is to generate a low-$NO_x$ fuel that will, when burned in a low-$NO_x$ combustor, reduce emissions of $NO_x$ to meet or exceed air quality emission limitations without the use of SCR/ammonia (i.e. generate a hydrogen-rich sulfur free, highly steam diluted fuel).

Another object of the invention is to generate more thermal power (heat release) per mass flow of inlet air to the gas turbine than any previous gas turbine power plant (achieve practical levels of oxygen depletion from higher firing temperatures available as a result of this invention and from the use of dilute fuels available as a result of this invention).

Another object of the invention is to convert the energy released in the combustion of natural gas into shaft work with greater efficiency than any previous gas turbine powerplant (i.e., leave a minimum of residual energy in the stack gas, the only significant source of energy unconverted to shaft work).

Another object of the invention is to specify a gas turbine powerplant such that it can be operated unmanned, but with a higher level of durability, reliability, availability, and maintainability than achieved by any previous gas turbine powerplant (i.e. no steam cycle and employ once-through heat exchangers).

Another object of the invention is to lower the gas turbine driven powerplant's stack temperature to the dew point (i.e. facilitate future economic recovery and recycle of the water vapor in the stack gas flow).

Another object of the invention is to create a sink for low grade heat that is presently rejected from typical gas turbine powerplants and return that heat to the cycle.

Another object of the invention is to permit the cooling of high pressure compressor components permitting operation at higher temperatures and pressures.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
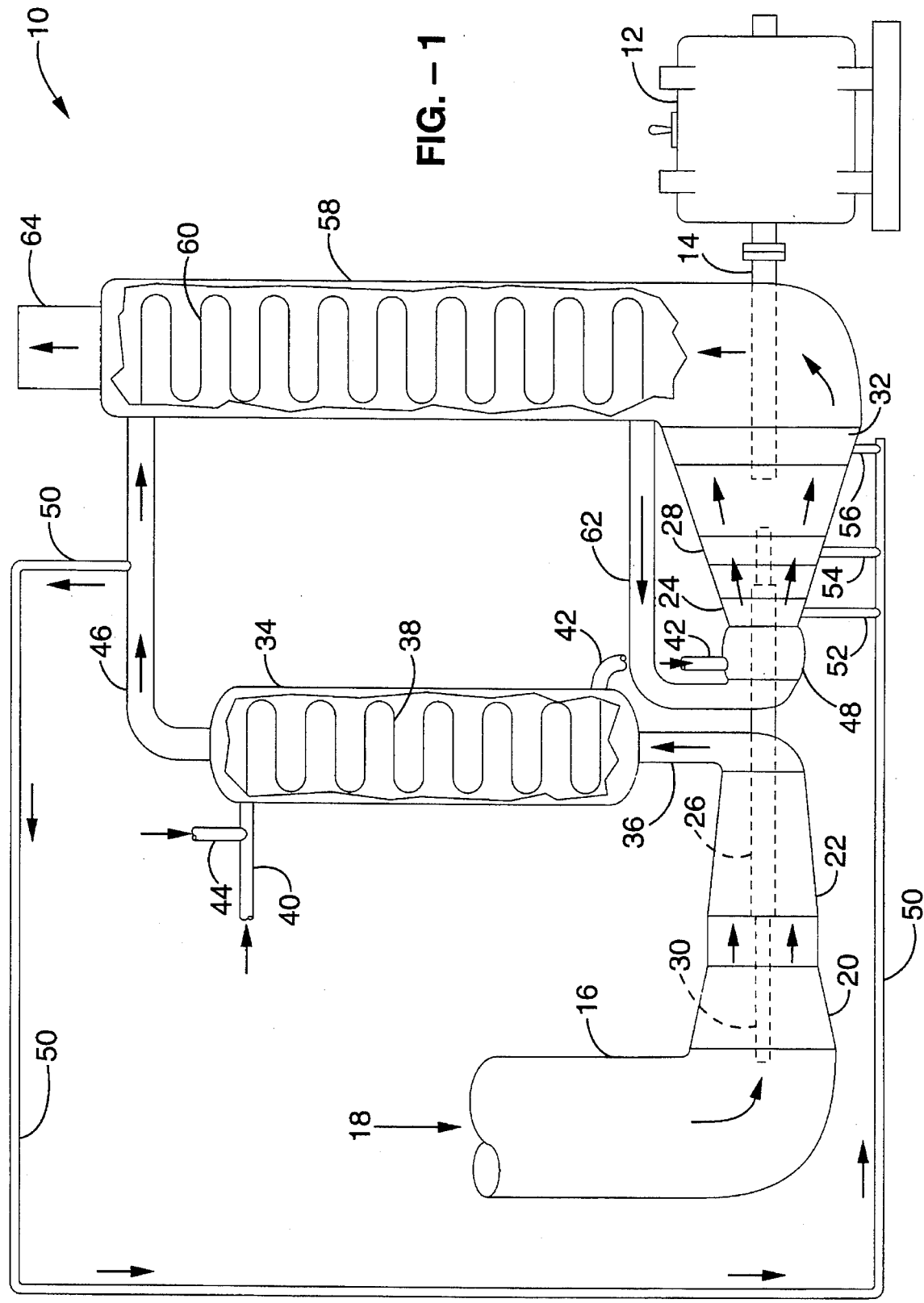
FIG. 1 is a schematic diagram of a gas turbine driven power plant in accordance with the present invention showing a heat exchanger down stream of the compressor and a regenerator downstream of the heat exchanger.

Referring more specifically to the drawings, for illustrative purposes the present invention is embodied in the apparatus schematically shown in FIG. 1 through FIG. 11 where like reference numerals correspond to like elements. It will be appreciated that the apparatus may vary as to configuration and as to details of the parts without departing from the basic concepts as disclosed herein.

Referring to FIG. 1, a gas turbine driven powerplant 10 is shown coupled to a load 12 such as an electrical generator or the like by a shaft 14. Those skilled in the art will appreciate that the powerplant 10 can be used to operate other devices from which power may be extracted.

Powerplant 10 typically includes a compressor inlet 16 for receiving filtered air 18 for compression. A low pressure compressor 20 is positioned downstream of air inlet 16, and a high pressure compressor 22 is positioned downstream of low pressure compressor 20 for producing a high pressure, high temperature downstream flow. A high pressure turbine 24 is mechanically coupled to high pressure compressor 22 by a shaft 26, and a low pressure turbine 28 is positioned downstream of high pressure turbine 24 and mechanically coupled to low pressure compressor 20 by a shaft 30. An aerodynamically coupled power turbine 32 is positioned downstream of low pressure turbine 24 and coupled to shaft 14. The compressors and turbines employed may be of conventional aircraft design, or of other types typically used in gas turbine driven powerplants. Those skilled in the art will appreciate that additional compressors and turbines may be utilized.

A heat exchanger 34 is positioned downstream of high pressure compressor 22 and coupled to the output of high pressure compressor 22 by an air input duct 36. Heat exchanger 34 can be a conventional once through countercurrent heat exchanger or the like or, if desired, a conventional catalytic methane/steam reformer. Heat exchanger 34 includes fuel carrying coils 38 which are coupled to a fuel inlet 40 and a fuel outlet 42. A water inlet 44 is also provided for mixing water with the input fuel, and an air output duct 46 is provided for routing the air which flows across coils 38 and exits heat exchanger 34.

As the high temperature compressed air passes over coils 38, heat is transferred to the fuel and water mixture flowing through coils 38. When using compressors of conventional designs, the temperature of the air discharged from high pressure compressor will be approximately 1100 to 1200 degrees Fahrenheit and the pressure of the air will be approximately 40 to 50 atmospheres. After passing through heat exchanger 34, however, the air temperature will be in the range of approximately 140 to 150 degrees Fahrenheit. At the same time, the temperature of the fuel/water mixture flowing through coils 38 will increase by approximately 1000 degrees Fahrenheit. Typically the fuel temperature will rise to a temperature which is approximately 20 to 50 degrees Fahrenheit lower than the temperature of the air discharged from high pressure compressor 22. The high temperature fuel flows through fuel outlet 42 and into the fuel inlet of combustor 48 where it is burned. Alternatively, the fuel can be further processed to a hydrogen-rich fuel gas before burning.

The cooled compressed air which exits heat exchanger 34 is divided into two streams. The first stream is a side stream which flows through coolant line 50 to provide air for cooling hot metal components in the compressors and turbines. For example, as shown in FIG. 1, the cool air is divided and flows through high pressure turbine coolant line 52, low pressure turbine coolant line 54, and power turbine coolant line 56, respectively. This low temperature air serves as an excellent coolant for the compressor and turbine blades and vanes, thereby permitting use of high combustion temperatures as compared to conventional gas turbine driven powerplants. In conventional powerplants, cooling is typically effected using the high temperature air discharged from the high pressure compressor. Therefore, in the present invention, the coolant temperature can be as much as approximately 1000 degrees Fahrenheit lower than in conventional gas turbine powerplants.

The remaining cooled compressed air feeds a conventional regenerator (plate-fin recuperator) 58 which is positioned downstream of heat exchanger 34 and coolant line 50. The cooled air flows through air carrying coils 60 and is routed through an air duct 62 which feeds combustor 48. Exhaust gas exiting power turbine 32 through the exhaust ducting flows across coils 60 and through regenerator 58, and then courses out an exhaust stack 64. The heat from the exhaust gas passing over coils 60 is thereby transferred to and heats the air flowing through coils 60. The air is heated to a temperature approaching the temperature of the exhaust gas and is suitable for use as combustion air for combustor 48. Therefore, not only is the cooled air reheated for use as combustion air, but the exhaust gases are cooled before they exit exhaust stack 64.

As indicated before, heat exchanger 34 may be a conventional hot-air-to-fuel heat exchanger or, preferably, a conventional catalytic methane/steam reformer. Since the temperature of the air discharged from high pressure compressor 22 will be on the order of 1100 to 1200 degrees Fahrenheit, it is suitable for use in the production of reformed fuel. The reformer catalyst would preferably be one which reacts with a hydrocarbon fuel such as natural gas or naphtha. Since conventional reformers utilize a nickel-based catalyst which can be poisoned by sulphur, the fuel used should be desulphurized or have an extremely low sulphur content. Additionally, the water should be purified to standards equivalent to those where water is used in a steam driven powerplant. The water is heated to steam and reacts endothermically with the fuel and catalyst to produce a hydrogen-rich combustible effluent. The hydrogen-rich combustible effluent from the methane/steam reformer is then used to fuel the combustor which produces low $NO_x$ combustion products.

Figure 2:
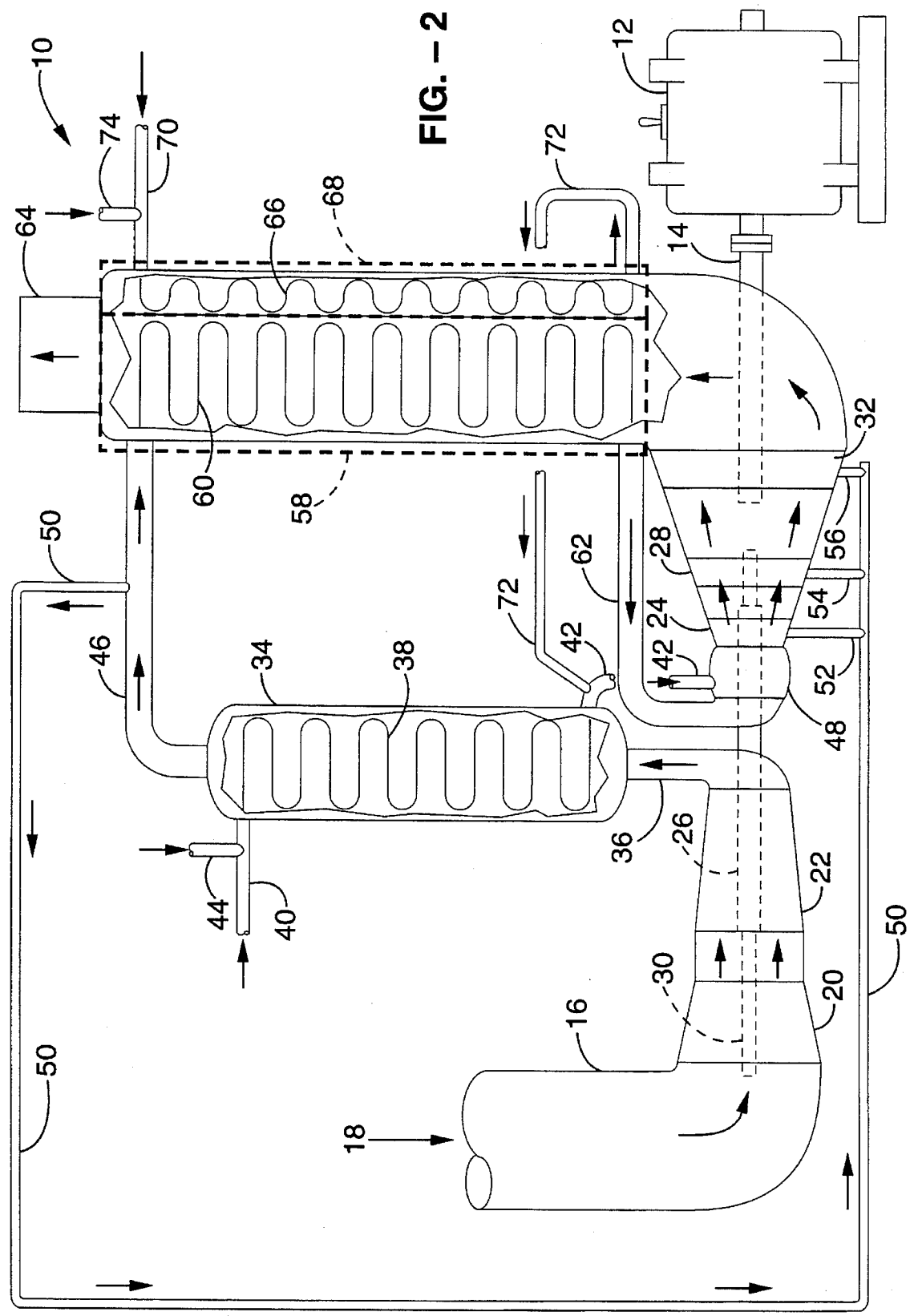
FIG. 2 through 4 are schematic diagrams of alternate embodiments of the gas turbine driven powerplant shown in FIG. 1.

Referring now to FIG. 2, an alternative embodiment of the invention is shown in which heat exchanger 34 is a first methane/steam reformer. In this embodiment, the exhaust gas flow from power turbine 32 is divided between the regenerator 58 and the fuel carrying coils 66 of a second methane/steam reformer 68, respectively. Through mechanical design of the regenerator 58 (given expected pressures and volumes of exhaust stream gas and cooled compressed air from the first methane/steam reformer 34), enough of the power turbine exhaust gas stream heat will be directed through the regenerator 58 to simultaneously bring the cooled compressed air flow from the first methane/steam reformer 34 up to a close approach to the temperature of the exhaust gas stream while bringing the temperature of the exhaust gas stream down to a close approach to the temperature of the cooled compressed air exiting the methane/steam reformer 34. The remaining heat contained in the power turbine exhaust gas stream is available for use in the second methane/steam reformer 68 which is designed to extract enough of that heat to cool this second portion of the exhaust gas stream to approximately the same pressure and temperature as the portion of the exhaust gas stream exiting the regenerator 58. This division of exhaust gas flow into two parallel flows will yield a thermodynamically matched heat exchange regenerator.

Coils 66 of second methane/steam reformer 68 are coupled to a fuel inlet 70 and a fuel outlet 72. A water inlet 74 is also provided for mixing water with the input fuel. Fuel outlet 72 is coupled to fuel outlet 42 (or the fuel inlet of combustor 48) so that the hydrogen-rich combustible effluent from the second methane/steam reformer 68 combines with the hydrogen-rich combustible effluent from the first methane/steam reformer 34 to fuel combustor 48. In addition, the two cooled, parallel flowing, exhaust gas streams exiting the regenerator 58 and second methane/steam reformer 68 rejoin and course out exhaust stack 64.

Figure 3:
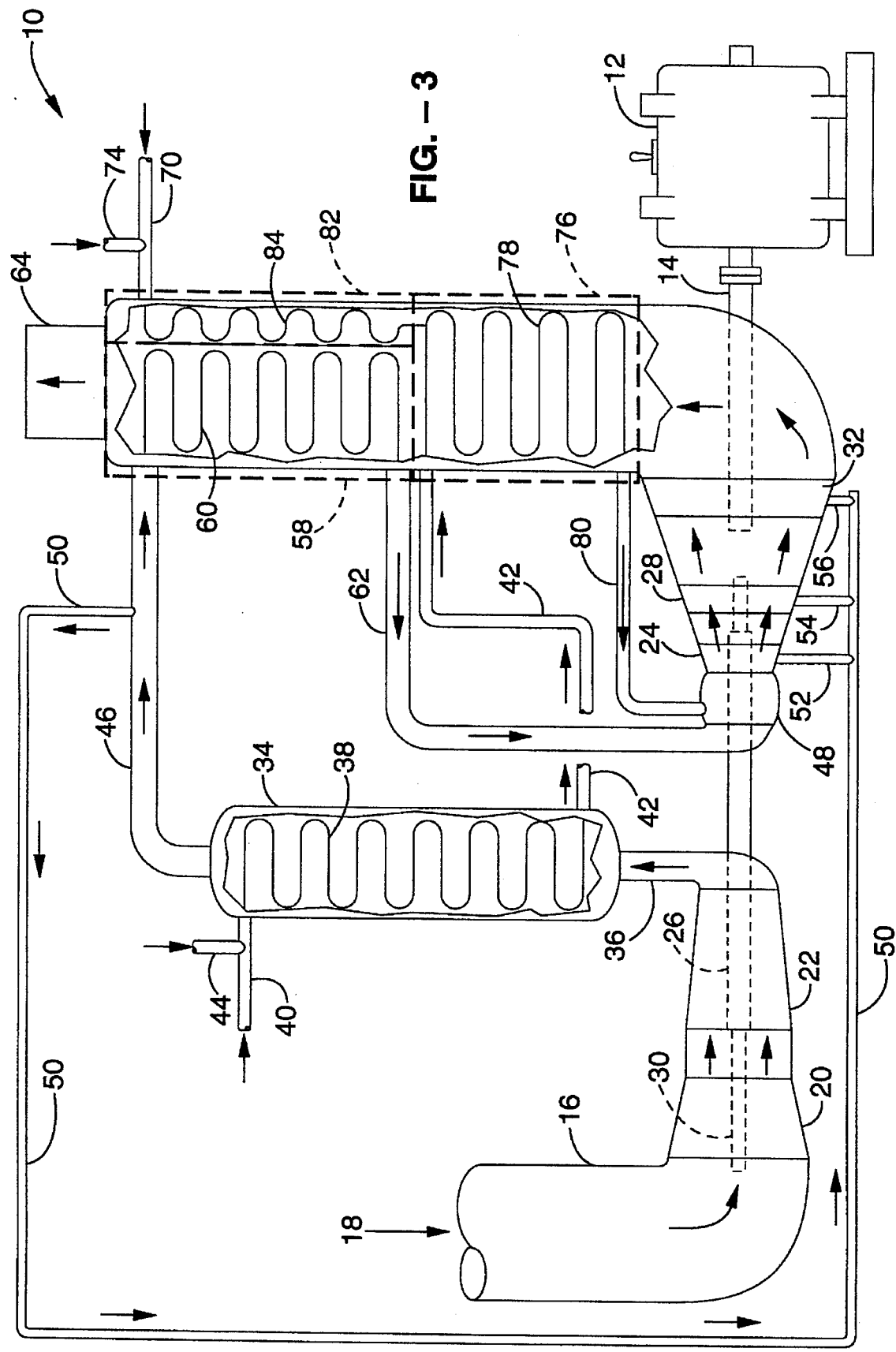

Referring now to FIG. 3, an alternative embodiment of the invention is shown in which heat exchanger 34 is a heat exchanger, and a methane/steam reformer 76 is positioned down stream of the exhaust gas stream from power turbine 32. Here, the entire exhaust gas stream flows over the fuel carrying coils 78 of methane/steam reformer 76. In this embodiment, fuel outlet 42 from heat exchanger 34 is directly coupled to the fuel input of methane/steam reformer 76. In this manner, heat exchanger 34 serves as a first reformer feed preheat exchanger to increase the fuel temperature prior to reforming and to cool the compressor discharge air. By doing so, the hydrogen content of the reformed fuel will increase to provide a higher quality combustible effluent. The hydrogen-rich combustible effluent from methane/steam reformer 76 is fed into combustor 48 through fuel outlet 80.

Down stream of methane/steam reformer 76, the partially cooled exhaust gas flow from power turbine 32 is mechanically divided between regenerator 58 and a second reformer feed preheat exchanger 82, respectively. Division of the exhaust gas flow is accomplished in the same manner as described above. One end of fuel carrying coils 84 of second reformer preheat exchanger 82 is coupled to fuel inlet 70 and water inlet 74; the other end is coupled to coils 78 of methane/steam reformer 76. Therefore, a second flow of combustible fuel passes through second reformer feed preheat exchanger 82 and feeds methane/steam reformer 76. In addition, the two cooled, parallel flowing, exhaust gas streams exiting the regenerator 58 and second reformer preheat exchanger 82 rejoin and course out exhaust stack 64.

Figure 4:
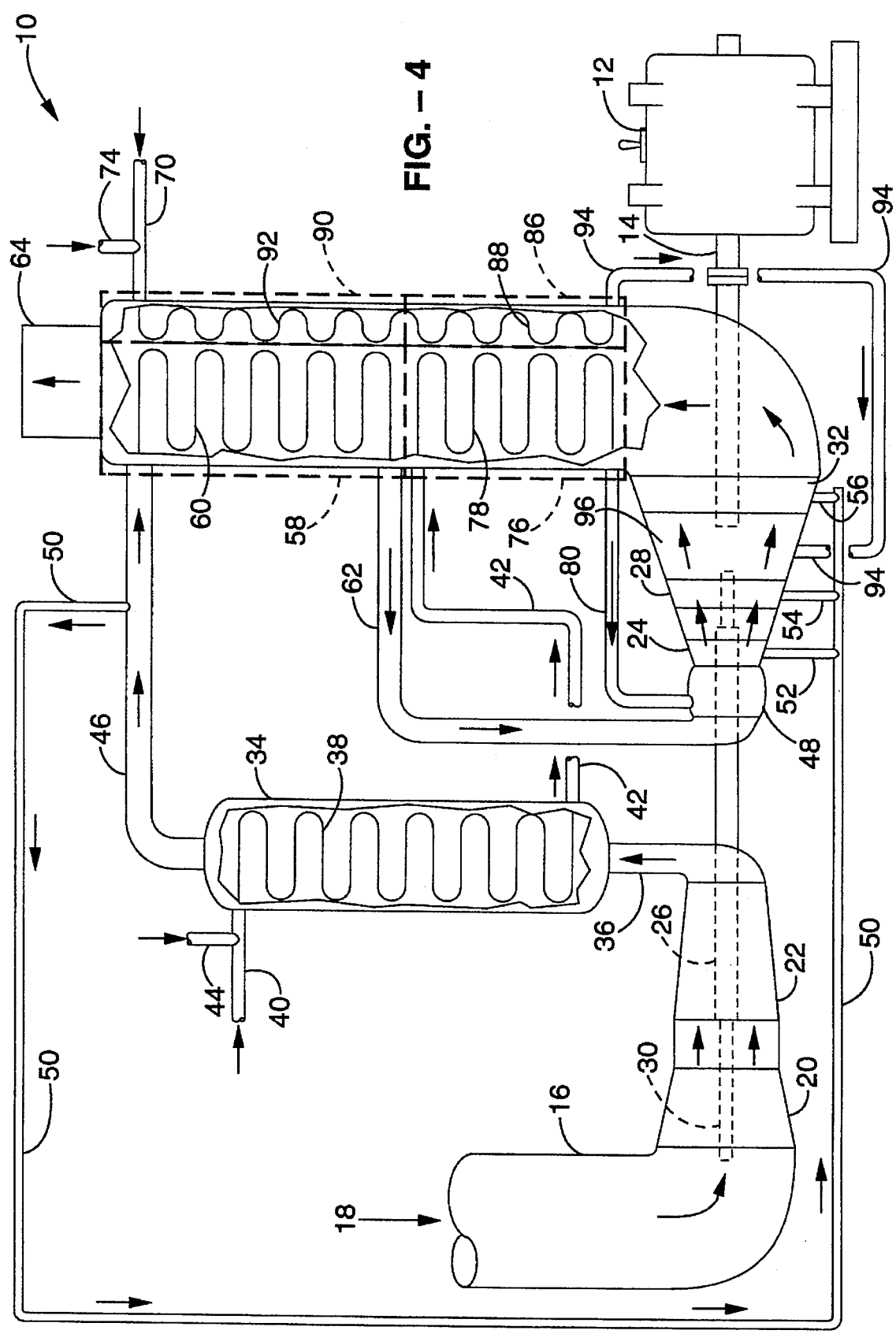

Referring now to FIG. 4, an alternative embodiment of the invention is shown in which heat exchanger 34 is a heat exchanger, and a methane/steam reformer 76 is positioned down stream of the exhaust gas stream from power turbine 32. However, instead of the entire exhaust gas stream flowing over the coils 78 of methane/steam reformer 76 as was seen in the embodiment of FIG. 3, the exhaust gas flow exiting the power turbine 32 is mechanically divided between a first methane/steam reformer 76 (which is a high pressure reformer) and a second methane/steam reformer 86 (which is a low pressure reformer).

Down stream of the high pressure methane/steam reformer 76 and the low pressure methane/steam reformer 86, the partially cooled parallel-flowing exhaust gas streams from power turbine 32 flow in parallel through the regenerator 58 and a low pressure reformer feed preheat exchanger 90, respectively. The exhaust gas flows are mechanically divided between the regenerator 58 and the low pressure reformer feed preheat exchanger 90 as described above. Further down stream, the two cooled, parallel-flowing, exhaust gas streams exiting regenerator 58 and low pressure reformer feed preheat exchanger 90 rejoin and course out exhaust stack 64.

In this embodiment, fuel outlet 42 from heat exchanger 34 is directly coupled to the input of the high pressure methane/steam reformer 76, and the hydrogen-rich combustible effluent from the high pressure methane/steam reformer 76 is fed into combustor 48 through fuel outlet 80.

A second flow of combustible fuel passes through the low pressure reformer feed preheat exchanger 90 and feeds the low pressure methane/steam reformer 86. One end of fuel carrying coils 92 of low pressure feed preheat exchanger 90 is coupled to fuel inlet 70 and water inlet 74; the other end is coupled to fuel carrying coils 88 of low pressure methane/steam reformer 86. The hydrogen rich combustible effluent from the low pressure methane/steam reformer 86 flows through low pressure fuel outlet 94 to the fuel inlet $NO_x$ reheat combustor 96 positioned between low pressure turbine 28 and power turbine 32.

Preferably, the high temperature hydrogen-rich low pressure fuel gas effluent from the low pressure methane/steam reformer 86 is introduced into the gas turbine flow path from the trailing edge of the stationary vanes and/or rotating blades of the low pressure turbine 28 up stream of the power turbine 32. Because of the unique combustion characteristics of the hydrogen component and high temperature of the low-$NO_x$ fuel and the high air temperature, the fuel will auto ignite (i.e. require no flame holder apparatus) with complete combustion occurring in a nominal distance after injection into the air stream. Thus, the reheat combustion can be readily accomplished using available stationary vanes and/or rotating blades with their existing internal air cooling passages to also effect metal cooling, but, particularly, to convey the low NO$_x$ fuel to the trailing edge injection orifices for injection into the main gas stream with rapid and complete combustion assured and with maximum fuel dilution/mixing and therefore, minimum NO$_x$ generating potential.

While the manufacturer's choice among design options presented in these different embodiments of the invention may be influenced by many factors including fuel type, emission requirements, expected load factors, and economic considerations, in general the embodiments have been presented in order from the least preferred to the most preferred. Each succeeding embodiment seeks to make greater use of the benefits of chemical recuperation of heat through the methane/steam reformation reaction for three significant reasons: (1) the resulting hydrogen-rich fuel will burn reliably and will allow the manufacturer to increase firing temperatures without creating NO$_x$, thus avoiding expensive back-end clean-up equipment, (2) the use of the methane/steam reformation process allows a smaller water/fuel ratio to be used with the same mass flow power augmentation benefits derived from traditional steam injected gas turbines, and lower use of water means that less latent heat escapes in stack exhaust, increasing overall efficiency in the conversion of fuel to electricity, and (3) the highly endothermic methane/steam reformation reaction is ideal for quickly transferring heat both in the compressor-aftercooling heat exchanger and the heat exchangers used to capture exhaust heat.

In the final embodiment, two methane/steam reformers (high pressure and low pressure) are employed in order to take advantage of the fact that methane/steam reformation occurs to a higher degree at lower pressure. This dual reformer design also lends itself to use of the described reheat strategy whereby the hydrogen-rich fuel from the low pressure reformer can be routed through the cooling orifices in the low pressure turbine stationary vanes and/or blades to simultaneously cool that turbine and supply a reheat fuel that will auto-ignite and burn cleanly. This allows the manufacturer to obtain the efficiency benefits of reheat without costly redesign of the power turbine. Because the methane/steam reformation reaction is also a function of temperature, this reheat will also enhance the chemical recuperation of heat from the exhaust gas stream.

Referring to FIG. 1, FIG. 3 and FIG. 4, if a methane/steam reformer is not employed in the heat exchanger 34, a hydrogen-rich low-NO$_x$ fuel can be obtained by passing the high temperature steam/fuel mixture exiting the heat exchanger 34 through a bed of steam reforming catalyst (not shown).

Figure 5:
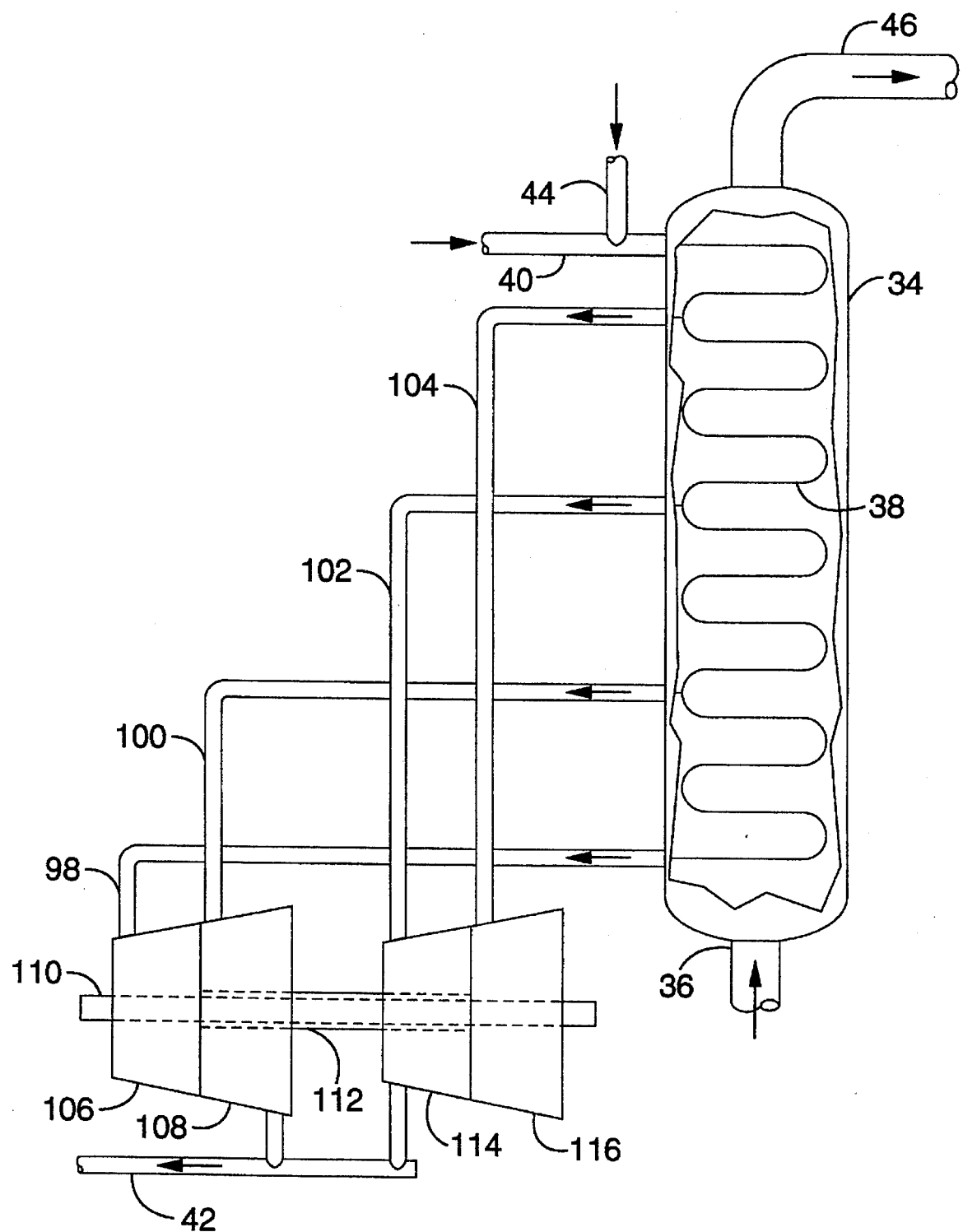
FIG. 5 is a schematic diagram of the heat exchanger portion of the present invention configured for steam raising.

Furthermore, referring also to FIG. 5, it should be noted that, in all embodiments in which the heat exchanger 34 serves only as a heat exchanger (including serving as a reformer feed preheat exchanger), the steam/fuel mixture exiting the heat exchanger 34 must be of sufficient pressure to enter the combustor 48. Both the water and combustible entering the heat exchanger 34 will have been raised to sufficient pressure (approximately 50 to 100 psia greater than the pressure in the combustor). The heat exchanger 34 ideally has two requirements to meet: (1) it must reduce the compressed air temperature to the lowest practical level, and (2) it must produce as much steam/fuel mixture at the required pressure as possible.

Enhancing the performance of heat exchanger 34 so that the air temperature can be lowered to the lowest practical level can be accomplished by generating steam at multiple pressures. However, in this instance, we have use for only one pressure of steam/fuel mixture—that pressure which will allow entry to the combustor 48 and we wish to convert all of the heat extracted from the air side to steam at the required pressure. To allow the extraction of steam/fuel at multiple pressures while still meeting the need for injecting steam/fuel into the combustor 48 at a the required pressure, a steam raising means can be employed.

For example, heat exchanger 34 will typically include a plurality of coil sections. By selectively tapping the coil sections, the steam/fuel mixture can be removed at four points 98, 100, 102 and 104 corresponding to four different pressure levels. Preferably, heat exchanger 34 will be tapped such that two of the pressure levels will be in excess of required pressure and two will be below the required pressure. The two highest pressure steam/fuel flows 98, 100 will be routed through steam turbines 106, 108, respectively, which are connected by shafts 110, 112 to steam compressors 114, 116 into which the two lower pressure steam/fuel mixture flows 102, 104 are routed. The higher pressure steam/fuel mixture will drive the turbines and compressors, thereby resulting in a pressure reduction. In turn, the compressors will compress the lower pressure steam/fuel mixture, thereby resulting in a pressure increase. The outputs of the compressors and turbines are combined so that the steam/fuel mixture exhausted from the compressors and the turbines through fuel outlet 42 will be one combined flow at the required pressure. As can be seen, therefore, the compressors and turbines operate as means for expanding lower pressures, lowering higher pressures, and equalizing the pressure in the steam/fuel mixture. In addition, the amount of steam in the steam/fuel mixture will be increased.

Figure 6:
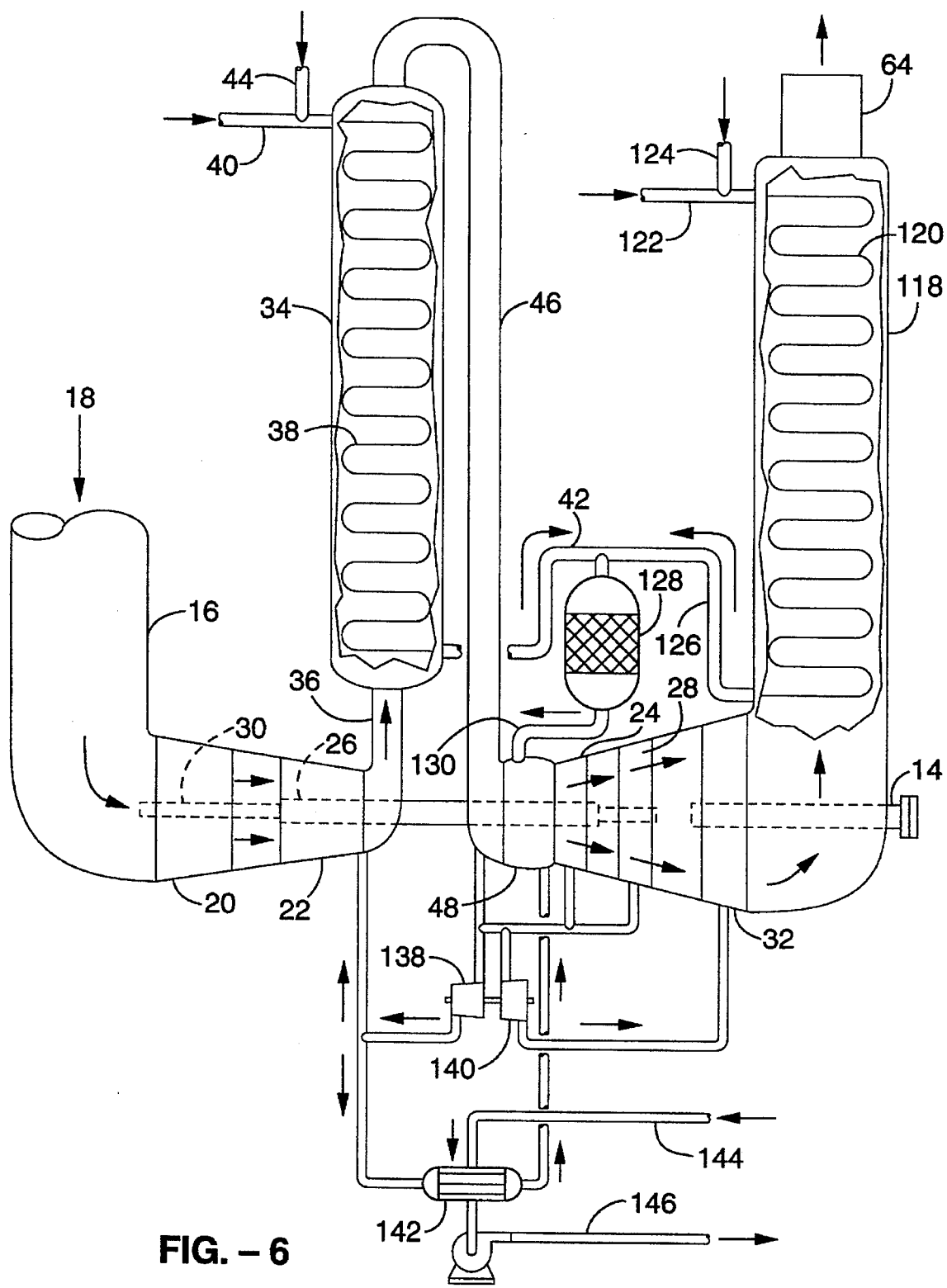
FIGS. 6 through 8 are schematic diagrams of alternate embodiments of the gas turbine driven powerplant shown in FIG. 1 that route the bulk of the cooled compressed air directly to the combustor and employ a once-through exhaust heat recovery unit in place of a regenerator.
Figure 7:
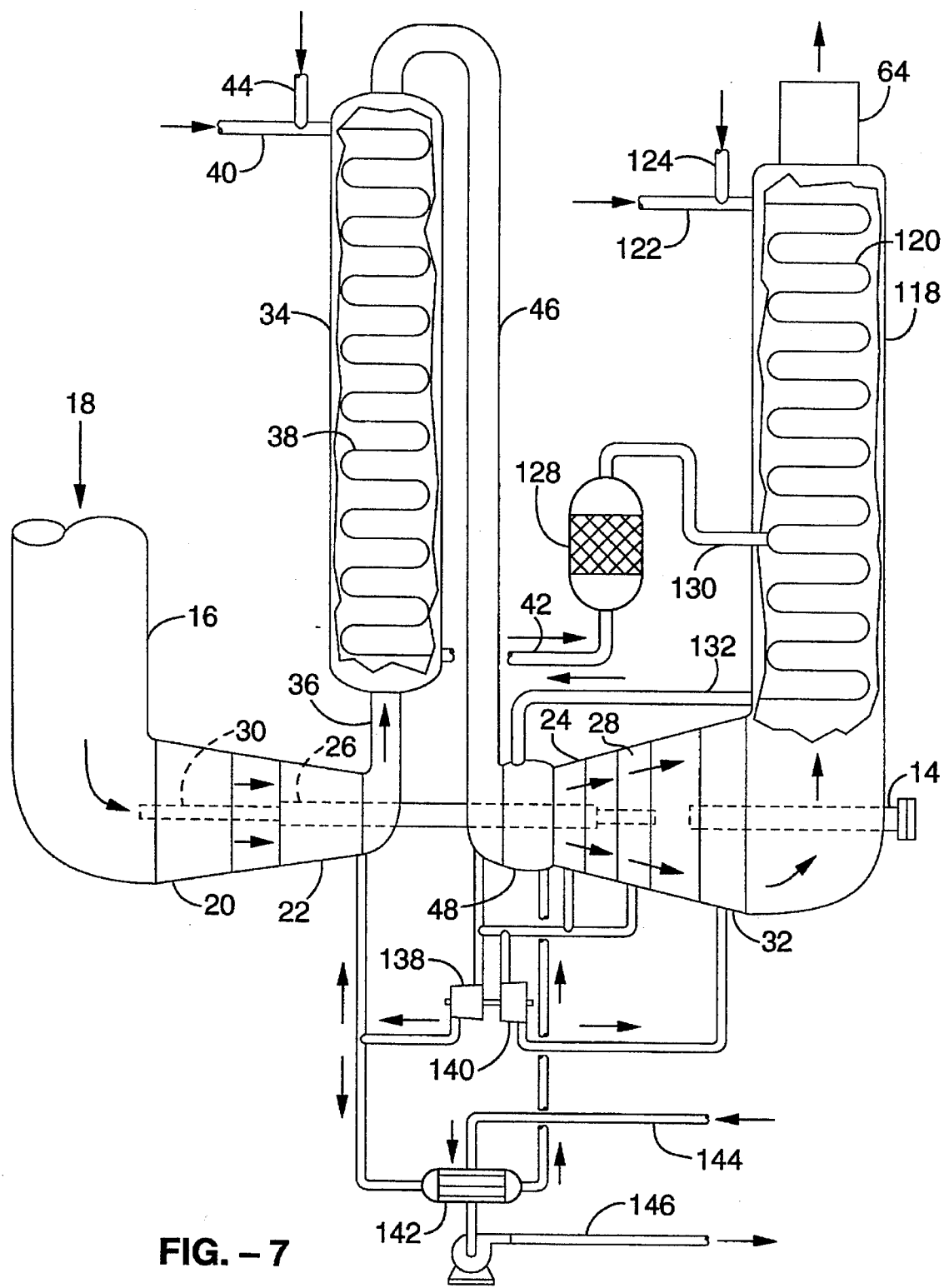
Figure 8:
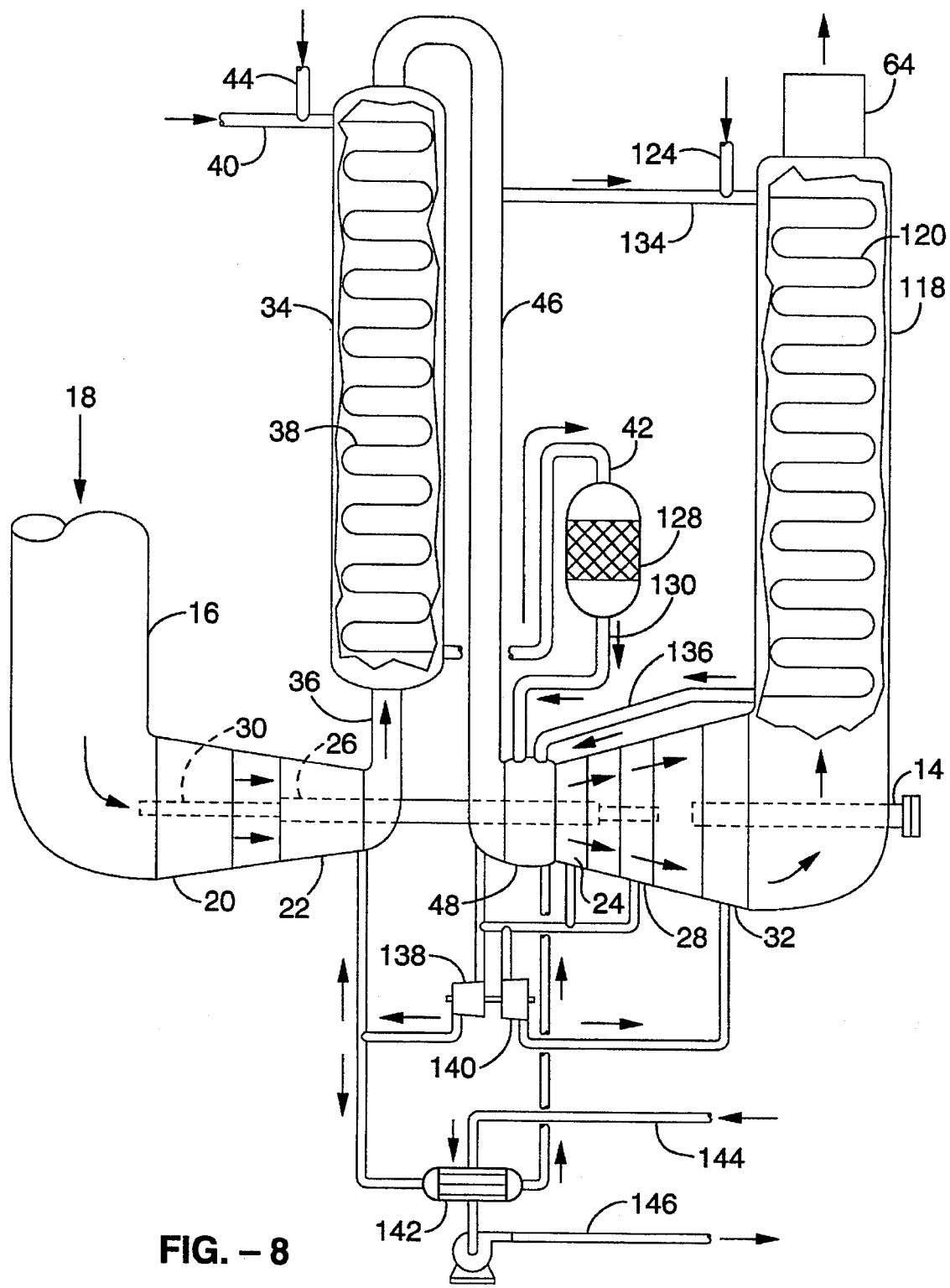

Referring now to FIG. 6 through FIG. 8, it is also possible to augment power output by increasing the mass flow through the turbine by injecting the cooled compressed air not required for metal component cooling and low grade heat recuperation directly into the combustor 48. This requires more fuel to be burned in order to achieve the firing temperatures at which the turbine is designed to operate. This higher fuel demand also permits increased injection of steam, and this additional fuel and water can be used to recuperate the exhaust heat. Therefore, instead of using a regenerator (plate-fin recuperator), these embodiments recuperate the exhaust heat with a counter-current flow of combustible and water, or water and air, in a conventional once-through counter-current heat recovery unit (heat exchanger) 118.

Referring more specifically to FIG. 6, the cool compressed air exiting the heat exchanger 34 is fed directly into the combustor 48 with the exception of a small portion which is used for other cooling functions such as cooling of metal components in the engine hot sections, and acting as a heat sink for returning to the cycle the low grade heat generated in the bearings, transformer, and generator windings as described below. As before, fuel and water are introduced into fuel carrying coils 38 of heat exchanger 34 by means of fuel inlet 40 and water inlet 44, respectively. Similar in design and construction to heat exchanger 34, heat recovery unit 118 includes effluent carrying coils 120 which are coupled to fuel inlet 122 and water inlet 124. The heated effluent from heat exchanger 34 flowing through fuel outlet 42 and from heat recovery unit 118 flowing through fuel outlet 126 is combined and fed into the inlet of a conventional adiabatic catalytic methane-steam reformer 128 which generates a significant hydrogen component to enhance combustion at high dilution thus allowing reduced formation of NO$_x$. This low Btu fuel gas exits the reformer 128 and is injected into combustor 48 through fuel outlet 130.

Referring now to FIG. 7, in an alternative embodiment the hot fuel gas effluent exiting heat exchanger 34 through fuel outlet 42 is passed through a conventional adiabatic catalytic methane-steam reformer 128 as before. Here, however, the effluent is heated before being introduced into combustor 48. Because the use of reformer 128 will result in a temperature drop in the effluent of approximately two to three hundred degrees Fahrenheit, it may be desirable to raise the temperature before introduction into the combustor. This cooler fuel gas flow combines with the counter-current flow of fuel gas in the exhaust heat recovery unit 118 at the point where the fuel gas in that unit has achieved approximately the same temperature, and the combined flow is introduced into combustor 48 through fuel outlet 132. The combined flow recuperates the remaining high temperature fraction of the exhaust gas heat, and minimizes the amount of exhaust heat recuperation water required.

It should be noted that, if the hydrogen content of this combined flow of fuel gas is sufficient to support high dilution combustion, the flow of fuel gas is routed directly to the combustor. However, if additional hydrogen is required, it can be produced by passage of the fuel gas stream through an auto-thermal reformer (not shown) prior to injection of the fuel gas into the combustor. The auto-thermal reformer, if required, will use a small addition of the cooled high pressure air in order to maintain the fuel gas temperature while passing through the reforming catalyst bed.

Figure 9:
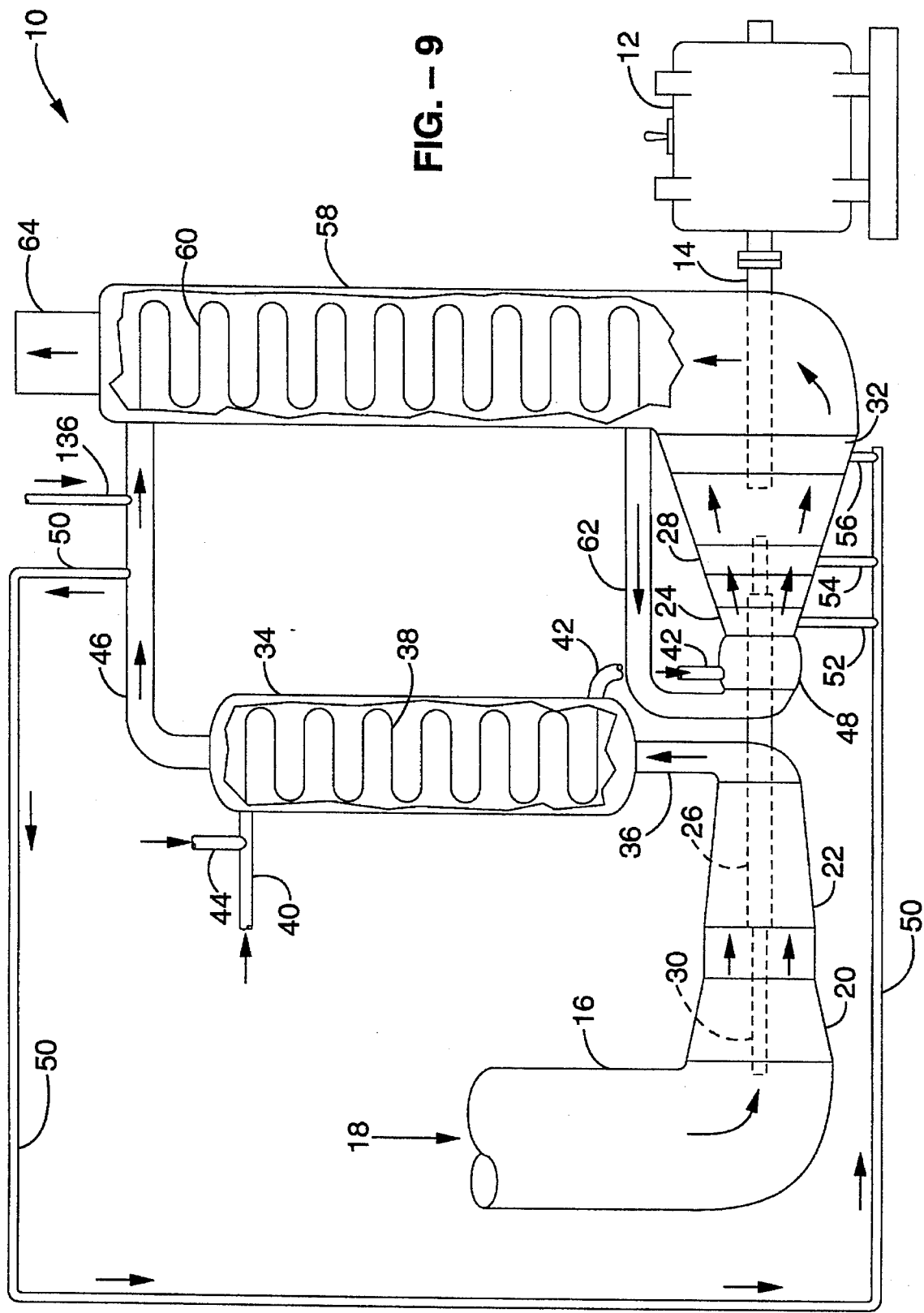
FIG. 9 is a schematic diagram of an alternative embodiment of the gas turbine driven powerplant shown in FIG. 1 employing a two phase air/water feed into the combustor.

Referring now to FIG. 8, instead of combining fuel and water in heat recovery unit 118, a small portion of the cool air from heat exchanger 34 is combined with the recuperation water to form a two phased feed of water and air. Here, the effluent from heat exchanger 34 flowing through fuel outlet 42 into reformer 128 and the resulting hydrogen rich fuel is fed into combustor 48 through fuel outlet 130. A side stream of cool air from air output duct 46 is routed to effluent carrying coils 120 of heat recovery unit 118 through air duct 134. The resultant air/steam mixture is then routed directly to combustor 48 through steam duct 136. As can be seen in FIG. 9, it is also possible to achieve a portion of the benefits of the two phased feed approach of FIG. 8 in embodiment of FIG. 1. This can be accomplished by introducing water into the cool air flowing through air output duct 46 by means of a water inlet 136.

Those skilled in the art will appreciate, therefore, that the two phased feed approach used in exhaust heat recovery can be employed in the embodiments of FIG. 1 through FIG. 4 as well.

In addition, while heat exchanger 34 in the embodiments of FIG. 1, 3 and 4 has been heretofore described as including either a conventional hot-air-to fuel heat exchanger or a conventional methane/steam reformer, alternatively a conventional countercurrent heat exchanger can be employed. In the case where a conventional countercurrent heat exchanger is employed, instead of fuel being introduced through fuel inlet 40, air could be introduced for a two phased feed approach through heat exchanger 34. Similarly, such a two phased feed approach could be employed in the embodiments of FIG. 6 through FIG. 9. In all of these embodiments where heat exchanger 34 is used for a two phased feed, fuel would be introduced into combustor 48 by means of a separate feed, which can be accomplished in any conventional manner either directly or by means of a reformer.

Figure 10:
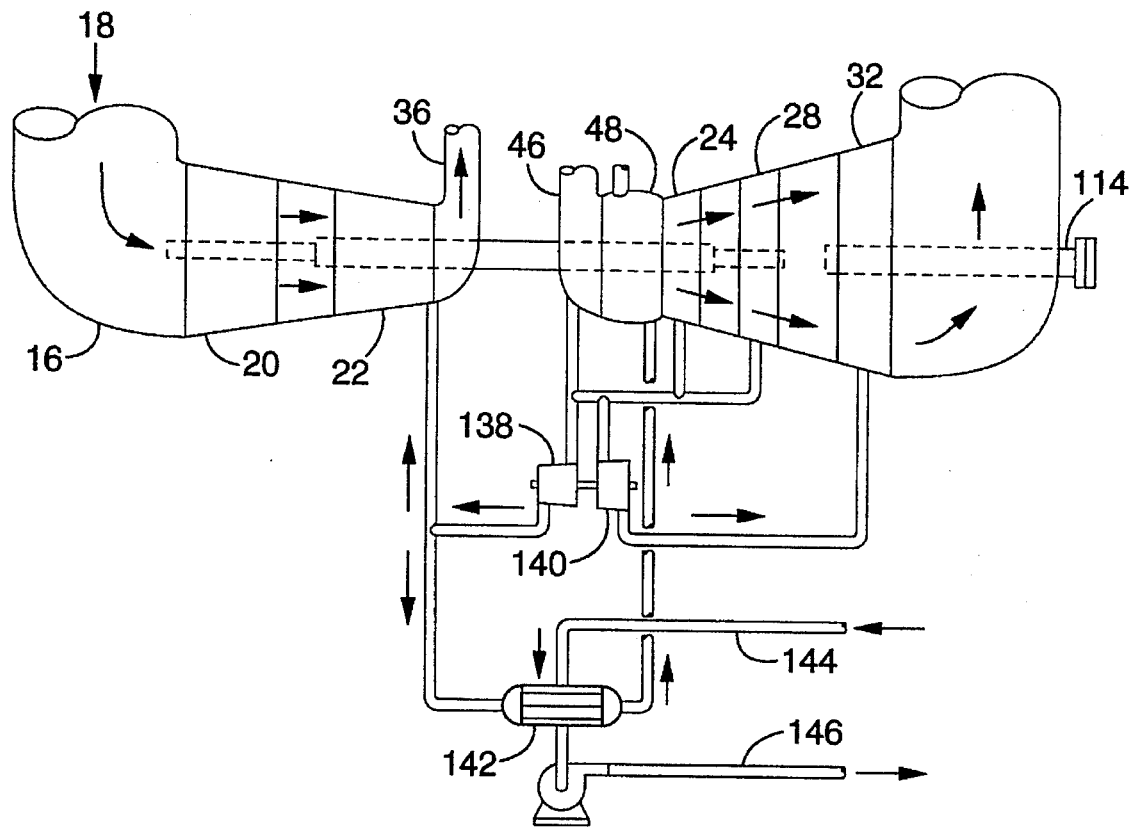
FIG. 10 is a schematic diagram of the compressor/expander portion of the present invention used for turbine cooling and for cooling ancillary equipment in a gas turbine driven powerplant having a power turbine.

Referring also to FIG. 10, it can be seen that a portion of the cool air flowing through air output duct 46 may be used for cooling the high pressure compressor 22 as well as for cooling auxiliary equipment associated with the powerplant. In this regard, however, it should be noted that the passage of the air through the heat exchanger 34 leaves the pressure of the cool air insufficient to effect cooling of the blades in high pressure compressor 22. Therefore, it is necessary to boost the pressure of the air. In the embodiment shown in FIG. 10, a portion of the air is routed to both high pressure turbine 24 and low pressure turbine 28, and the remainder is divided between the compressor 138 and expander 140 portions of a single-shaft booster compressor/expander as shown. The expander 140 will be fed by a flow sufficient to meet the cooling air requirement of power turbine 32. The shaft work derived by this small expansion will reduce the pressure and effect a slight cooling of this air and will supply the shaft work required by the booster compressor 138. The remaining air is routed to the booster compressor 138. A portion of the air exiting the booster compressor 138 can be made available to effect cooling of high pressure compressor 22. The remaining air exiting the booster compressor 138 is available to accept the low grade heat that is generated in the gas turbine generator's auxiliary equipment (e.g. bearings, transformers, and generator windings). This pressure boosted air will be employed as a tube-side coolant in a surface condenser 142 which has an auxiliary equipment input line 144 and an auxiliary equipment output line 146. The condenser 142 condenses refrigerant vapor generated through vaporization at the previously mentioned low grade heat sources. The booster compressed air that has accepted this low grade heat is then routed back to the combustor 48 where it supplements the highest grade heat in the system. Alternatively, the entire side stream of cooled compressed air could be delivered to the single-shaft booster compressor/expander as described above and the high pressure turbine would be cooled by a portion of the pressure boosted air.

As can be seen, FIG. 10 depicts a gas turbine driven powerplant which utilizes a power turbine 32. In the embodiment shown in FIG. 11, only high pressure and low pressure turbines are employed. In such a configuration, a portion of the cool air is routed to cool the high pressure turbine 24, the remainder is divided between the compressor 138 and expander 140, and the pressure reduced flow from expander 140 is used to meet the cooling requirement of low pressure turbine 28.

Figure 11:
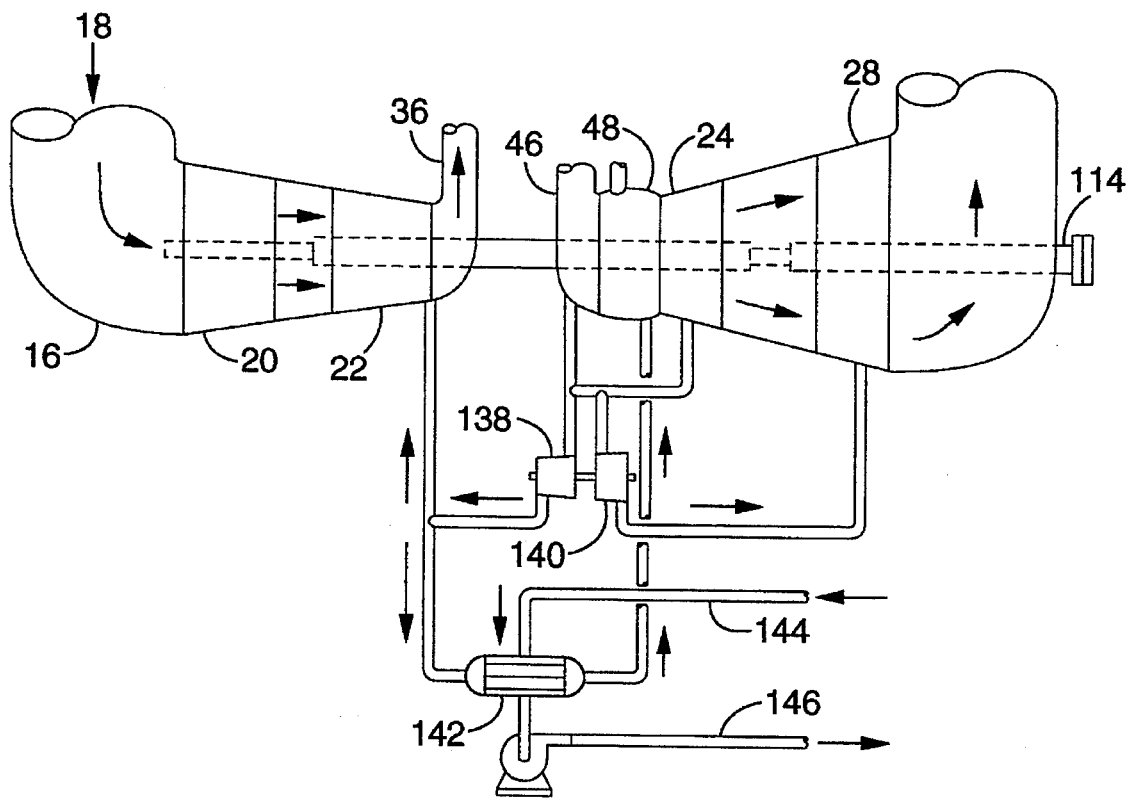
FIG. 11 is a schematic diagram of the compressor/expander of FIG. 10 shown configured for a gas turbine driven powerplant which does not employ a power turbine.

Those skilled in the art will appreciate that the configurations of FIG. 10 and 11 can be employed in any of the embodiments described herein.

Accordingly, it will be seen that this invention provides a high efficiency, low pollutant gas turbine driven powerplant with superior turbine cooling capabilities. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A gas turbine driven powerplant, comprising:
   (a) compressor means for producing a downstream flow of air, wherein said compressor means comprises the final compression stage in said powerplant;
   (b) heat exchanger means for cooling said downstream flow of air and for heating a mixture of a combustible effluent and a non-combustible effluent, said heat exchanger means positioned downstream of said compressor means;

(c) a combustor positioned downstream of said heat exchanger means, said combustor fueled by said heated mixture of combustible and non-combustible effluents; and (d) a turbine positioned downstream of said combustor.

2. A gas turbine driven powerplant, comprising:

(a) compressor means for producing a downstream flow of air, wherein said compressor means comprises the final compression stage in said powerplant;

(b) heat exchanger means for cooling said downstream flow of air and for converting a mixture of combustible effluent and water into a mixture of combustible effluent and steam, said heat exchanger means positioned downstream of said compressor means;

(c) a combustor positioned downstream of said heat exchanger means, said combustor fueled by said mixture of combustible effluent and steam; and (d) a turbine positioned downstream of said combustor.

3. An apparatus as recited in claim 2, further comprising reformer means for converting said mixture of combustible effluent and steam into a hydrogen-rich fuel for fueling said combustor.

4. A gas turbine driven powerplant, comprising:

(a) compressor means for producing a downstream flow of air, wherein said compressor means comprises the final compression stage in said powerplant;

(b) heat exchanger means for cooling said downstream flow of air and for converting a two-phase feed of combustible effluent and water into a mixture of combustible effluent and steam, said heat exchanger means including effluent carrying coils, said effluent carrying coils having a water/combustible effluent inlet and a combustible effluent/steam outlet, said heat exchanger means positioned downstream of said compressor means;

(c) a combustor positioned downstream of said heat exchanger means, said combustor coupled to said combustible effluent/steam outlet; and (d) a turbine positioned downstream of said combustor.

5. A gas turbine driven powerplant as recited in claim 4, further comprising reformer means for converting said mixture of combustible effluent and steam into a hydrogen-rich effluent for fueling said combustor.

6. A gas turbine driven powerplant as recited in claim 5, further comprising exhaust heat recovery unit positioned downstream of said turbine.

* * * * *